United States Patent
Mahmood

(10) Patent No.: US 11,029,661 B2
(45) Date of Patent: *Jun. 8, 2021

(54) REMOTE USER INTERFACE ACTUATION USING A PIEZOELECTRIC GRID

(71) Applicant: Avaya Inc., Basking Ridge, NJ (US)

(72) Inventor: Shahid Mahmood, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,558

(22) Filed: Mar. 4, 2019

(65) Prior Publication Data

US 2019/0196433 A1   Jun. 27, 2019

Related U.S. Application Data

(63) Continuation of application No. 15/357,471, filed on Nov. 21, 2016, now Pat. No. 10,254,734.

(51) Int. Cl.
| | |
|---|---|
| *G05B 19/042* | (2006.01) |
| *G06F 3/0488* | (2013.01) |
| *G06F 3/041* | (2006.01) |
| *G06F 11/00* | (2006.01) |

(52) U.S. Cl.
CPC ......... *G05B 19/0428* (2013.01); *G06F 3/041* (2013.01); *G06F 3/04883* (2013.01); *G06F 11/00* (2013.01); *G05B 2219/23258* (2013.01); *G05B 2219/24048* (2013.01); *G06F 2203/04105* (2013.01)

(58) Field of Classification Search
CPC combination set(s) only.
See application file for complete search history.

(56) References Cited

U.S. PATENT DOCUMENTS

| | | | |
|---|---|---|---|
| 2004/0200109 A1 | 10/2004 | Vasquez | |
| 2009/0167704 A1* | 7/2009 | Terlizzi | G09B 23/28 |
| | | | 345/173 |
| 2009/0250267 A1* | 10/2009 | Heubel | G06F 3/016 |
| | | | 178/18.03 |
| 2012/0218204 A1* | 8/2012 | Kim | G06F 3/0433 |
| | | | 345/173 |
| 2015/0072789 A1 | 3/2015 | Heubel | |
| 2016/0167277 A1 | 6/2016 | Hoeglinger | |
| 2017/0188979 A1 | 7/2017 | Volpe | |
| 2018/0078992 A1* | 3/2018 | High | G06Q 10/08 |
| 2018/0107378 A1* | 4/2018 | Rosenberg | G06F 3/04883 |

FOREIGN PATENT DOCUMENTS

| | | |
|---|---|---|
| CN | 101782816 A | 7/2010 |
| CN | 101982783 A | 3/2011 |
| CN | 102645631 A | 8/2012 |
| CN | 103026322 A | 4/2013 |
| CN | 104714054 A | 6/2015 |
| CN | 204882820 U | 12/2015 |

\* cited by examiner

*Primary Examiner* — Mamadou L Diallo

(57) ABSTRACT

Embodiments disclosed herein provide systems, methods, and computer-readable media to remotely actuate a user interface of a computing device. In a particular embodiment, a method includes receiving actuation information for a targeted portion of the user interface and determining control signals for a piezoelectric grid. The control signals direct application of electricity to the piezoelectric grid to deform the piezoelectric grid for actuation of the targeted portion of the user interface. The method further includes transferring the control signals to the piezoelectric grid.

20 Claims, 5 Drawing Sheets

REMOTE USER INTERFACE ACTUATION USING A PIEZOELECTRIC GRID

RELATED APPLICATIONS

This application is a continuation of U.S. patent application Ser. No. 15/357,471, entitled "TESTING USER INTERFACE FUNCTIONALITY THROUGH ACTUATION BY A PIEZOELECTRIC GRID," filed Nov. 21, 2016, which is hereby incorporated by reference in its entirety.

TECHNICAL FIELD

Aspects of the disclosure are related to testing user interface functionality of computing systems, and in particular, to remotely actuating a user interface using a piezoelectric grid.

TECHNICAL BACKGROUND

Computing systems typically include a user interface that enables user interaction with the device. The user interface may include buttons, switches, levers, touch screens, and other actuation elements that can be physically selected by a human user. Manufacturers of computing systems, software developers, and other interested parties often desire to test the actuation of the user interface to ensure proper operation.

Ideally, during the testing phase, the user interface of a computing system should be operated in the same manner as it would be used by human users. However, employing human testers to operate devices is very expensive and error prone, especially when testing a large number of devices. One automated solution involves the use of specialized robotics to actuate the various buttons and other elements of a user interface, but these systems are typically bulky, expensive to construct, and difficult to maintain. Another approach is to utilize purpose-built testing software, but this solution could result in testing the device in an environment that is different from the real-world deployed case which may alter the behavior of the computing system and produce unreliable test results.

Overview

Embodiments disclosed herein provide systems, methods, and computer-readable media to remotely actuate a user interface of a computing device. In a particular embodiment, a method includes receiving actuation information for a targeted portion of the user interface and determining control signals for a piezoelectric grid. The control signals direct application of electricity to the piezoelectric grid to deform the piezoelectric grid for actuation of the targeted portion of the user interface. The method further includes transferring the control signals to the piezoelectric grid.

In some embodiments, the control signals provide an electrical charge to an area of the piezoelectric grid mapped to the targeted portion of the user interface. In those embodiments, the control signals may provide the electrical charge to the area of the piezoelectric grid mapped to the targeted portion of the user interface by providing an electrical field of sufficient strength to effectuate actuation of the targeted portion of the user interface.

In some embodiments, the method further includes generating a control mapping of one or more areas of the piezoelectric grid to respective one or more portions, including the targeted portion, of the user interface. In those embodiments, determining the control signals may include determining which of the one or more areas of the piezoelectric grid corresponds to the targeted portion of the user interface. Also in those embodiments, the one or more portions of the user interface may include one or more buttons of the user interface, one or more device actuators of the user interface, and/or one or more locations on a touch screen.

In some embodiments, the actuation information is further for a second targeted portion of the user interface and wherein the control signals further direct application of electricity to the piezoelectric grid to deform the piezoelectric grid for actuation of the second targeted portion of the user interface.

In another embodiment, a system is provided having one or more computer-readable storage media and a processing system operatively coupled with the one or more computer-readable storage media. Program instructions stored on the one or more computer-readable storage media, when read and executed by the processing system, direct the processing system to receive actuation information for a targeted portion of the user interface and determine control signals for a piezoelectric grid. The control signals direct application of electricity to the piezoelectric grid to deform the piezoelectric grid for actuation of the targeted portion of the user interface. The program instructions further direct the processing system to transfer the control signals to the piezoelectric grid.

In yet another embodiment, an apparatus is provided that includes a piezoelectric grid comprising piezoelectric material that deforms upon application of electricity. The piezoelectric grid, when installed onto a surface of the user interface, receives control signals to actuate a targeted portion of the user interface. In some embodiments, the control signals comprise an electrical charge to an area of the piezoelectric grid mapped to the targeted portion of the user interface.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

As noted in the background above, testing a user interface of a computing device through remote actuation is a very common problem. To provide a more cost-effective and practical means for testing user-selectable functions of computing devices, the following disclosure takes advantage of the piezoelectric effect. Generally, the piezoelectric effect occurs when a mechanical force is applied to certain types of piezoelectric material and a resulting electrical charge is produced. Conversely, the piezoelectric effect will also cause the material to deform when an electrical charge is applied. This latter example is what will be leveraged for the techniques described herein.

Figure 3:
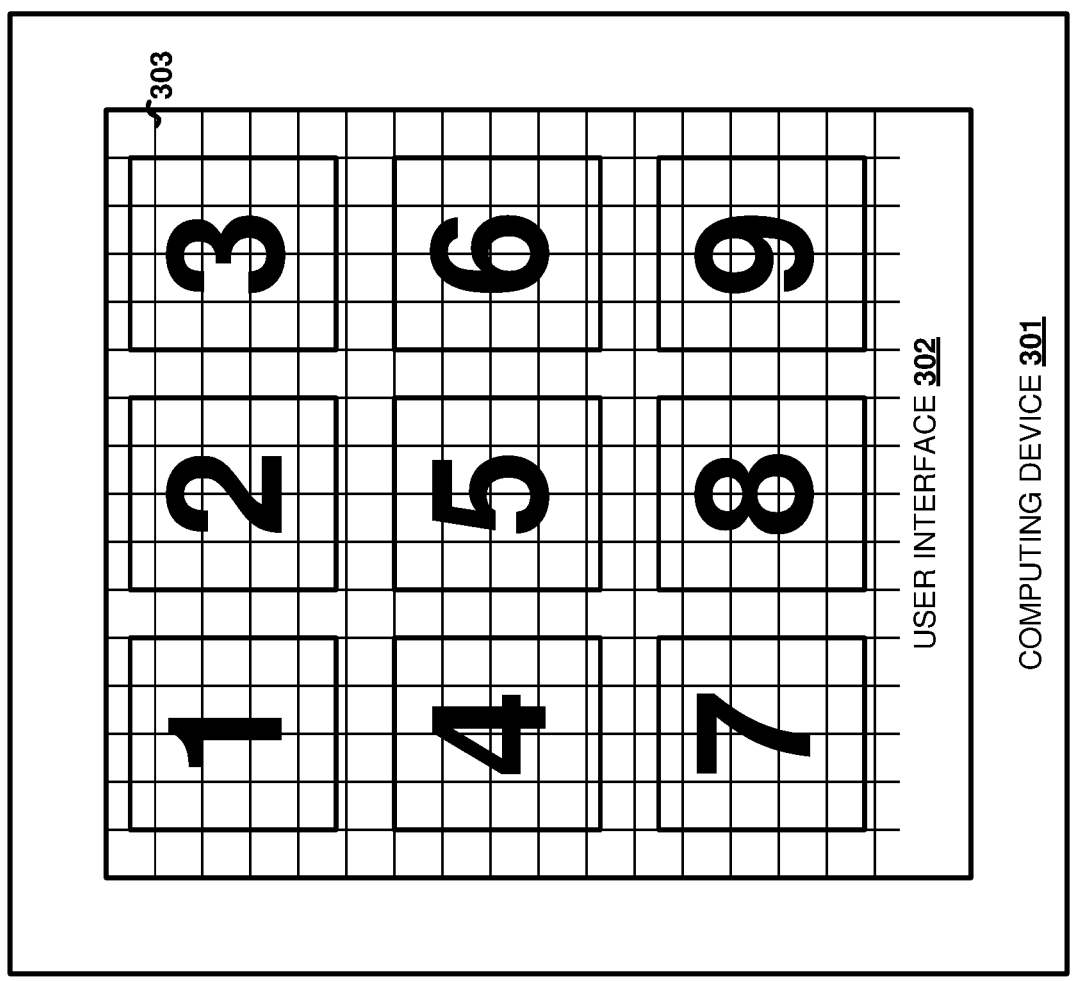
FIG. 3 is a block diagram that illustrates a user interface of a computing device having a piezoelectric grid installed thereon in an exemplary embodiment.

Specifically, the following disclosure proposes a grid made out of a piezoelectric material. The piezoelectric grid can then be placed over a set of buttons or some other actuators on a user interface of a computing device that requires testing. FIG. 3 illustrates an example of how such a grid might be placed over a dial pad of a telephonic device. The application of specific electrical charges to the vertical and horizontal segments of the grid causes the piezoelectric material to deform at various points. Accordingly, when a testing scenario requires pressing a particular button, then a charge can be applied to the grid that causes it to deform around the targeted button, causing the button to depress. Upon stopping the charge, the piezoelectric grid will return to its original state and release the button.

Figure 1:
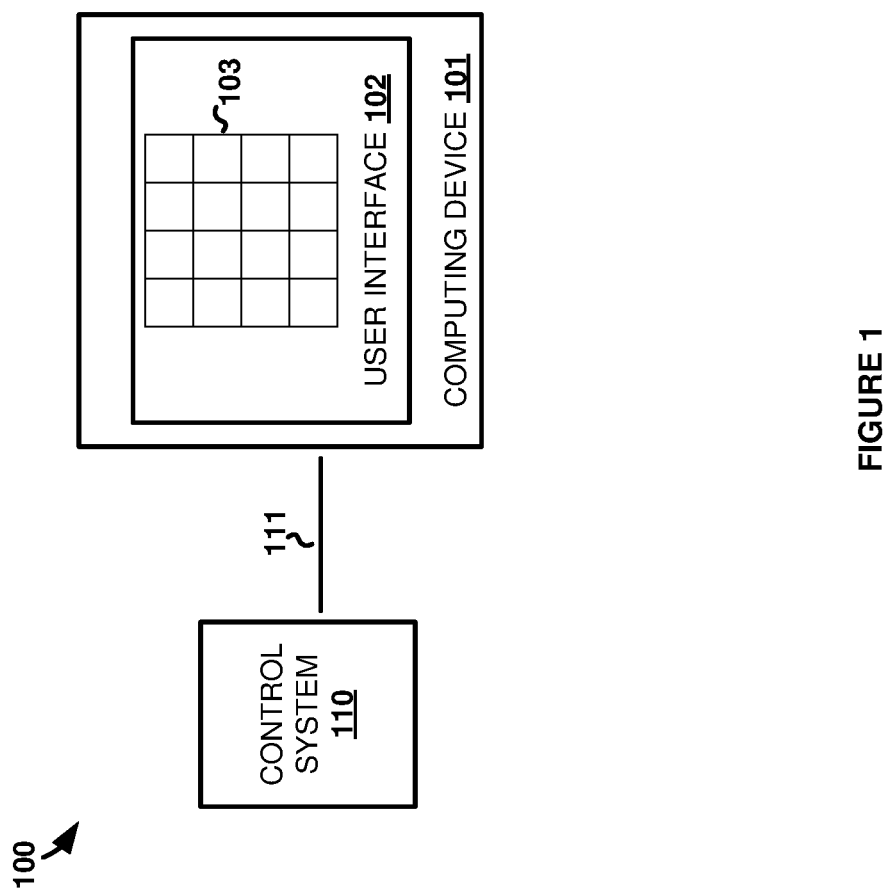
FIG. 1 is a block diagram that illustrates a communication environment to facilitate testing user-selectable functions on a user interface of a computing device.

Referring now to FIG. 1, a block diagram of communication environment 100 is illustrated. Elements of communication environment 100 may be utilized to facilitate testing user-selectable functions on a user interface of a computing device. Communication environment 100 includes control system 110 and computing device 101. Control system 110 and computing device 101 communicate over communication link 111. Computing device 101 includes user interface 102. Piezoelectric grid 103 is installed onto a surface of user interface 102 of computing device 101. Piezoelectric grid 103 comprises piezoelectric material that deforms upon application of electricity.

In operation, control system 110 may be configured with a mapping of the various control actuators of user interface 102 relative to corresponding areas of piezoelectric grid 103. Control system 110 can then cooperate with a test program to actuate the various user-selectable control elements on user interface 102 of computing device 101 as required by the test program. An exemplary operation to facilitate testing user-selectable functions on user interface 102 of computing device 101 will now be discussed with respect to FIG. 2.

Figure 2:
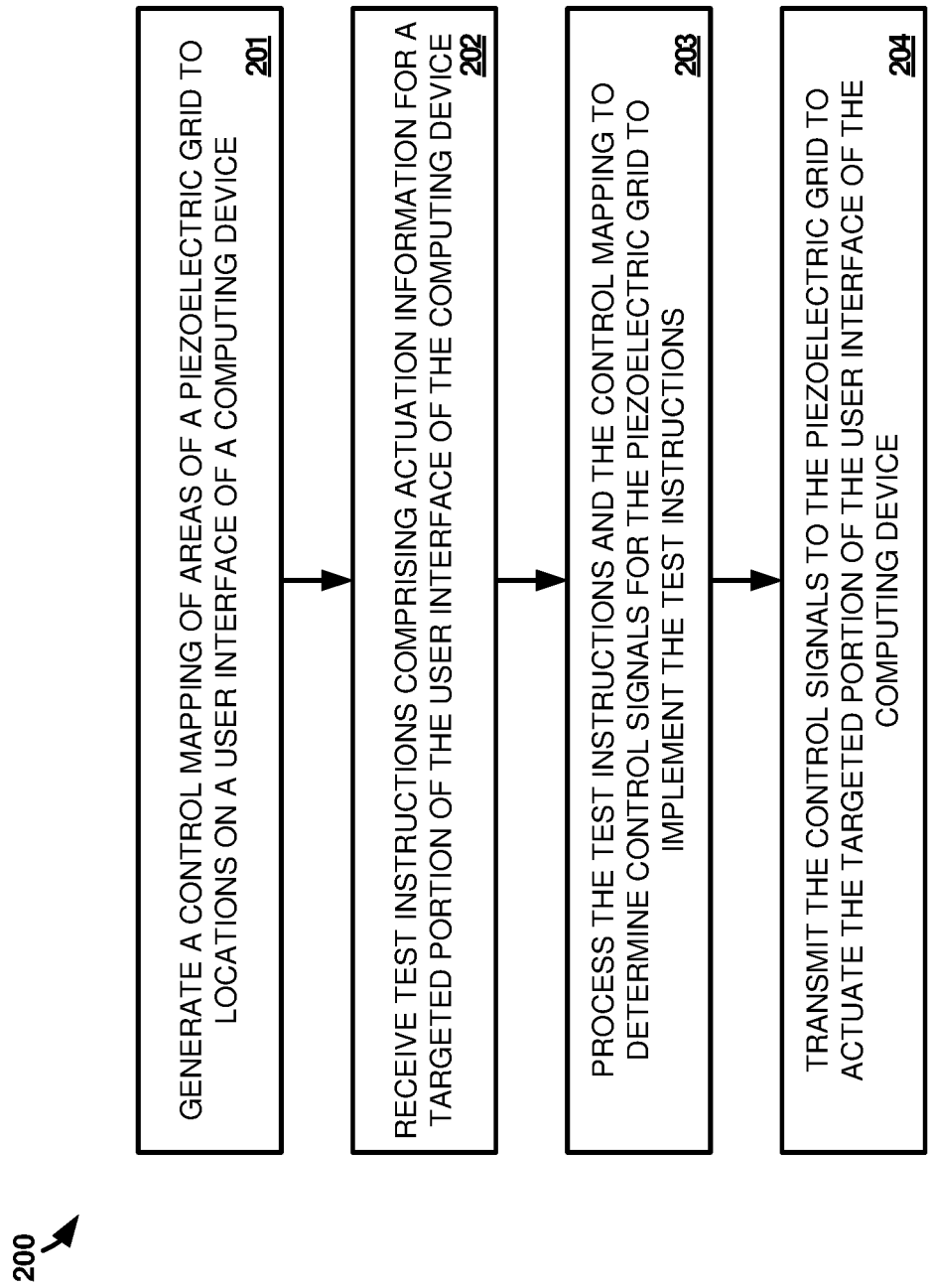
FIG. 2 is a flow diagram that illustrates a method of operating a control system to facilitate testing user-selectable functions on a user interface of a computing device.

FIG. 2 is a flow diagram that illustrates an operation 200 of communication environment 100. The operation 200 shown in FIG. 2 may also be referred to as testing process 200 herein. The steps of the operation are indicated below parenthetically. The following discussion of operation 200 will proceed with reference to control system 110 and computing device 101 of FIG. 1 in order to illustrate its operations, but note that the details provided in FIG. 1 are merely exemplary and not intended to limit the scope of process 200 to the specific implementation shown in FIG. 1.

Operation 200 may be employed by control system 110 to facilitate testing user-selectable functions on user interface 102 of computing device 101. As shown in the operational flow of FIG. 2, control system 110 generates a control mapping of areas of piezoelectric grid 103 to locations on user interface 102 of computing device 101 (201). As discussed above, piezoelectric grid 103, which comprises piezoelectric material that deforms upon application of electricity, is installed onto a surface of user interface 102. For example, piezoelectric grid 103 could comprise a mesh of piezoelectric material that is overlaid onto the surface of user interface 102. Any type of suitable piezoelectric material could be utilized to create piezoelectric grid 103, including various crystals such as quartz, aluminum phosphate, and topaz, synthetic crystals and ceramics, piezoceramics, semiconductor crystals, polymers such as polyvinylidene fluoride, or any other kind of material that exhibits piezoelectric properties. The control mapping generated by control system 110 typically maps different areas of piezoelectric grid 103 to corresponding locations on user interface 102. For example, in at least one implementation control system 110 could generate the control mapping of the areas of piezoelectric grid 103 to the locations on user interface 102 by defining where a plurality of buttons of user interface 102 are located relative to their corresponding portions of piezoelectric grid 103. In another example, control system 110 could generate the control mapping of the areas of piezoelectric grid 103 to the locations on user interface 102 by mapping coordinates on piezoelectric grid 103 to positions of device actuators on user interface 102 of computing device 101. Other techniques of generating the control mapping are possible and within the scope of this disclosure.

Control system 110 receives test instructions comprising actuation information for a targeted portion of user interface 102 of computing device 101 (202). Control system 110 could receive the test instructions in any manner, such as delivered over a communication network, preprogrammed into control system 110, uploaded from a flash drive or other removable media, input through a user interface of control system 110 by a test operator, or any other technique of providing test instructions to control system 110. The actuation information in the test instructions typically indicates the targeted portion of user interface 102 that should be actuated by control system 110, such as particular buttons, switches, levers, pressure-sensitive areas, or any other elements of user interface 102. For example, in at least one implementation, control system 110 could receive the test instructions comprising the actuation information for the targeted portion of user interface 102 by receiving the test instructions comprising the actuation information for one or more device actuators of user interface 102. These device actuators could comprise, for example, one or more buttons or pressure-sensitive areas of user interface 102. Further, in at least one implementation, user interface 102 could comprise a touch screen, and piezoelectric grid 103 could be fitted with a material capable of actuating the touch screen. In this case, the actuation information for the targeted portion of user interface 102 could comprise a touch screen gesture. In some implementations, the touch screen could be pressure sensitive and gestures may include pressure inducing actuation. In at least one implementation, the touch screen gesture could also include multi-touch gestures. Any other actuation information that indicates a targeted portion of user interface 102 for actuation could be included in the test instructions.

Control system 110 processes the test instructions and the control mapping to determine control signals for piezoelectric grid 103 to implement the test instructions (203). Typically, to process the test instructions and the control mapping to determine the control signals, control system 110 refers to the control mapping to identify the areas of piezoelectric grid 103 that are positioned over the targeted portion of user interface 102 indicated in the test instructions. For example, in at least one implementation, control system 110 could process the test instructions and the control mapping to determine the control signals for piezoelectric grid 103 by determining coordinates on piezoelectric grid 103 corresponding to the targeted portion of user interface 102 at which to apply the control signals. In some examples, the coordinates determined by control system 110 could include both horizontal and vertical position coordinates of piezoelectric grid 103. In addition, control system 110 could process the test instructions and the control mapping to determine the control signals for piezoelectric grid 103 by determining a magnitude of the electrical charge provided by the control signals needed to cause the piezoelectric material of piezoelectric grid 103 to physically actuate the targeted portion of user interface 102. For example, the design of piezoelectric grid 103 and the piezoelectric material used by the grid 103 may depend on a distance required for actuation of a particular user-selectable element of user interface 102, by the amount of pressure needed to actuate an element, or by some other factors that would effect the actuation of the targeted portion of user interface 102, and these variables could be accounted for by control system 110 when generating the control signals for piezoelectric grid 103 in some implementations.

Control system 110 transmits the control signals to piezoelectric grid 103 to actuate the targeted portion of user interface 102 of computing device 101 (204). As discussed above, the control signals are typically custom tailored by control system 110 to activate the appropriate areas of piezoelectric grid 103 for actuating the corresponding targeted portion of user interface 102 indicated in the test instructions. For example, in at least one implementation, the control signals provide an electrical charge to an area of piezoelectric grid 103 mapped to the targeted portion of user interface 102. The area of piezoelectric grid 103 mapped to the targeted portion of user interface 102 would then typically deform and protrude in response to the electrical charge provided by the control signals, causing that area of piezoelectric grid 103 to physically contact and actuate the targeted portion of user interface 102. For example, in some implementations, the control signals could provide the electrical charge to the area of piezoelectric grid 103 mapped to the targeted portion of user interface 102 by providing an electrical field of sufficient strength to effectuate actuation of the targeted portion of user interface 102.

Advantageously, control system 110 receives test instructions and generates and transmits control signals for piezoelectric grid 103 to implement the test instructions. Piezoelectric grid 103 is thus activated by the control signals to actuate a targeted portion of user interface 102 as directed by the test instructions. Control system 110 is thereby capable of remotely actuating various user-selectable functions of user interface 102 of computing device 101 to achieve automated testing of user interface 102 without the use of human operators or costly robotics systems. Accordingly, by enabling remote automated testing of user interface functionality through piezoelectric actuation, the techniques described herein provide the technical advantage of eliminating the need for any gears, pulleys, electromagnets, and other conventional electro-mechanical components, thereby also reducing the power consumption typically required to operate such mechanical components and robotics employed in alternative solutions. The disclosed techniques also help to eliminate the costs and imprecision associated with human test operators. In this manner, control system 110 provides an efficient and reliable testing environment by utilizing piezoelectric grid 103 to actuate various portions of user interface 102 of computing device 101.

FIG. 3 is a block diagram that illustrates user interface 302 of computing device 301 having piezoelectric grid 303 installed thereon in an exemplary embodiment. Note that the example described in FIG. 3 could be implemented using computing device 101 and other elements of communication environment 100, and could also be combined with operation 200 of FIG. 2 in some implementations. In this example, user interface 302 comprises a physical numeric keypad that would typically be found on a telephonic device. Piezoelectric grid 303 comprises a mesh of piezoelectric material that is placed on top of user interface 302. The vertical and horizontal lines that form piezoelectric grid 303 may be energized at targeted points in order to leverage the converse piezoelectric effect to deform the grid 303 to cause actuation of a particular button or buttons on the keypad of user interface 302. For example, each of the numerical buttons labeled one through nine on the keypad could be mapped to their corresponding horizontal and vertical coordinates on the piezoelectric grid 303, and a control system could apply the appropriate electrical charges to the coordinates mapped to the particular key or sequence of keys desired to be pressed for testing purposes. A detailed example of one way that a piezoelectric grid could be activated by a control system to actuate a button on a user interface will now be discussed with respect to FIG. 4.

Figure 4:
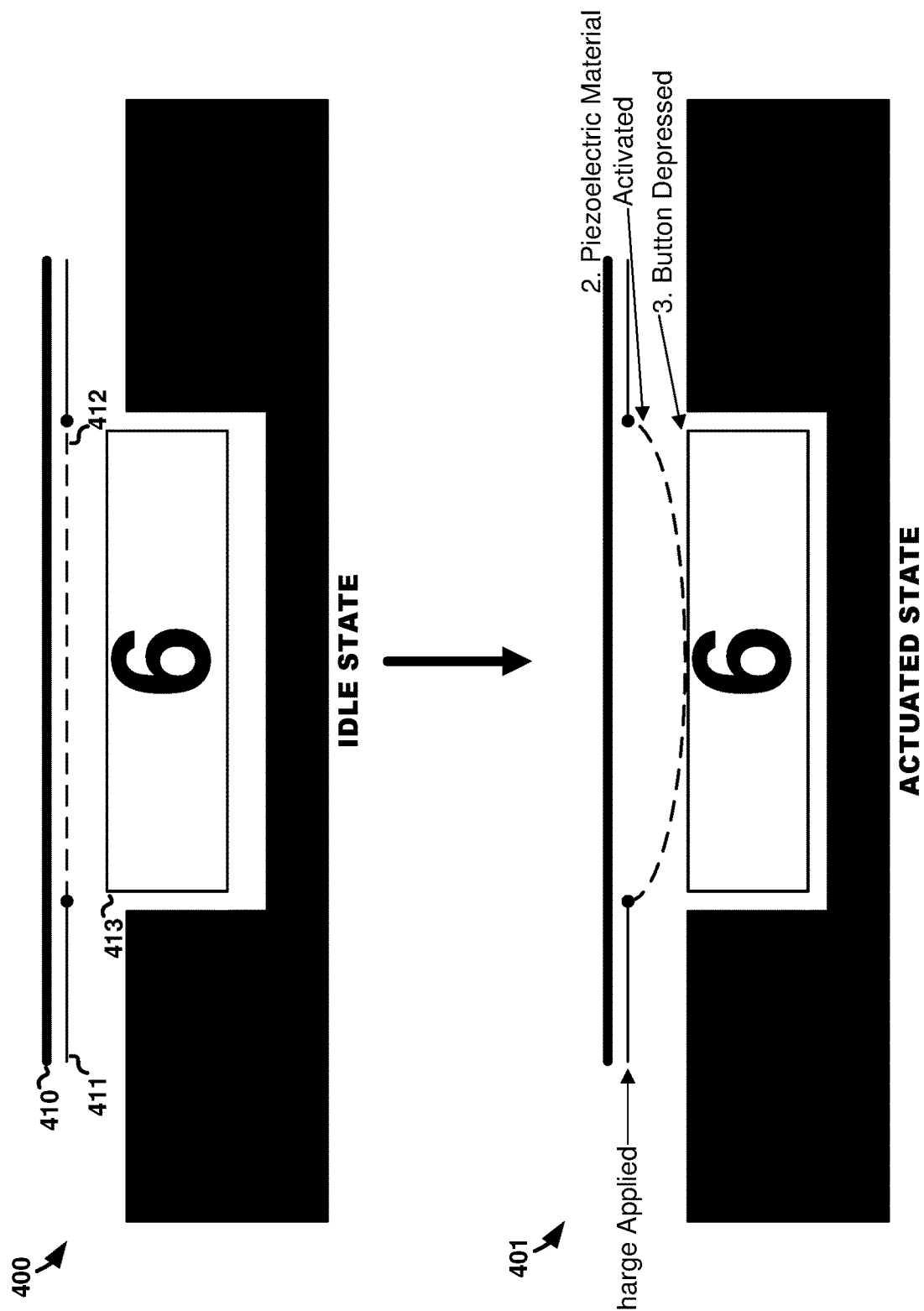
FIG. 4 is a block diagram that illustrates an operational scenario of activating a piezoelectric grid to depress a button of a user interface of a computing device in an exemplary embodiment.

FIG. 4 is a block diagram that illustrates an operational scenario of activating a piezoelectric grid to depress a button of a user interface of a computing device in an exemplary embodiment. Note that the example described in FIG. 4 could be implemented using computing device 101 and other elements of communication environment 100, and could also be combined with operation 200 of FIG. 2 in some implementations. The upper portion of FIG. 4 represents an idle state 400 of the piezoelectric wire 412 and button 413, while the lower portion represents an actuated state 401.

In this example, the actuation device comprises a reinforced back plate 410 supporting an electric wire 411 attached to a piezoelectric wire 412. The piezoelectric wire 412 is run proximate to a button 413 on a numeric keypad. As shown in idle state 400 of FIG. 4, the piezoelectric wire 412 is de-energized and button 413 is resting unselected.

In order to activate the piezoelectric wire 412, an appropriate electrical charge is applied to the attached electric wire 411 by a control system. Responsive to the electrical charge, the piezoelectric wire 412 deforms its shape, causing it to physically contact and depress button 413, as shown in actuated state 401. As discussed above, the piezoelectric wire 412 is typically part of a grid that is installed proximate to a user interface of a computing device. The design of the grid and the piezoelectric material used to construct the grid could depend on a distance required for button 413 to be actuated, by the amount of pressure needed to actuate button 413, or some other factors that would effect the actuation of button 413 by piezoelectric wire 412. While the example above describes a typical dial pad, the grid could be made to cover a device having any number or types of actuation elements. A control system for the grid would simply need to be configured with where elements on the user interface such as button 413 are located relative to the grid itself. Beneficially, the control system could then execute a test program to actuate the device as directed by the test program.

Referring back to FIG. 1, computing device 101 comprises a computer processor system and a communication interface. Computing device 101 could also include other components such as a microphone, camera, display, router, server, data storage system, and power supply. Computing device 101 may reside in a single device or may be distributed across multiple devices. Computing device 101 may be a discrete system or may be integrated within other systems, including other systems within communication environment 100. In some examples, computing device 101 could comprise a telephone, mobile phone, cellular phone, smartphone, computer, personal digital assistant (PDA), tablet, conference room system, e-book, mobile Internet device, network interface card, media player, game console, or some other communication apparatus, including combinations thereof.

Control system 110 comprises a computer processor system and communication interface. Control system 110 may also include other components such as a router, server, data storage system, and power supply. Control system 110 may reside in a single device or may be distributed across multiple devices. Control system 110 may be a discrete system or may be integrated within other systems, including other systems within communication environment 100. For example, although shown separately, control system 110 may be incorporated into computing device 101. Control system 110 could comprise a computing system, application server, call routing system, personal computer workstation, network gateway system, firewall, or some other communication system, including combinations thereof.

Communication link 111 uses metal, glass, air, space, or some other material as the transport media. Communication link 111 could use various communication protocols, such as Time Division Multiplex (TDM), Internet Protocol (IP), Ethernet, optical networking, communication signaling, Global System for Mobile Communications (GSM), Code Division Multiple Access (CDMA), High Speed Packet Access (HSPA), Evolution-Data Optimized (EV-DO), Long-Term Evolution (LTE), Worldwide Interoperability for Microwave Access (WiMAX), IEEE 802.11 protocols (Wi-Fi), Bluetooth, Internet, telephony, or some other communication format—including combinations thereof. Communication link 111 may be a direct link or could include intermediate networks, systems, or devices.

Figure 5:
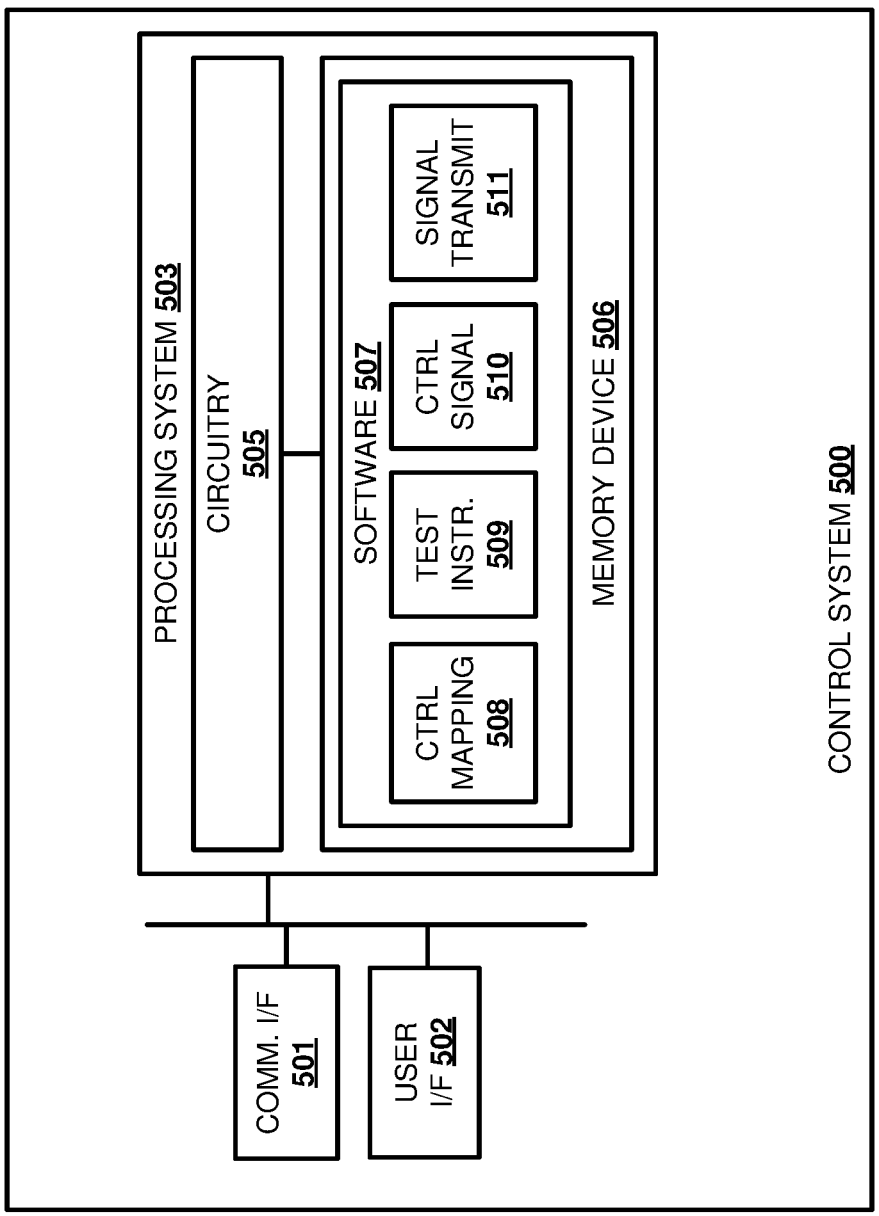
FIG. 5 is a block diagram that illustrates a computing architecture for implementing a control system to facilitate testing user-selectable functions on a user interface of a computing device.

FIG. 5 is a block diagram that illustrates a computing architecture for control system 500. Control system 500 provides an example of control system 110, although system 110 may have alternative configurations. Control system 500 comprises communication interface 501, user interface 502, and processing system 503. Processing system 503 is linked to communication interface 501 and user interface 502. Processing system 503 includes processing circuitry 505 and memory device 506 that stores operating software 507. Operating software 507 comprises software modules 508-511.

Control system 500 may be representative of any computing apparatus, system, or systems on which testing process 200 or variations thereof may be suitably implemented. Examples of control system 500 include mobile computing devices, such as cell phones, tablet computers, laptop computers, notebook computers, and gaming devices, as well as any other type of mobile computing devices and any combination or variation thereof. Note that the features and functionality of control system 500 may apply as well to desktop computers, server computers, and virtual machines, as well as any other type of computing system, variation, or combination thereof.

Communication interface 501 comprises components that communicate over communication links, such as network cards, ports, Radio Frequency (RF) transceivers, processing circuitry and software, or some other communication components. Communication interface 501 may be configured to communicate over metallic, wireless, or optical links Communication interface 501 may be configured to use TDM, IP, Ethernet, optical networking, wireless protocols, communication signaling, or some other communication format, including combinations thereof. In some examples, communication transceiver 501 could be configured to receive test instructions comprising actuation information for a targeted portion of a user interface of a computing device and transmit control signals to a piezoelectric grid to actuate the targeted portion of the user interface of the computing device.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory device 506 comprises a non-transitory computer-readable storage medium readable by processing circuitry 505 and capable of storing software 507, such as a disk drive, flash drive, data storage circuitry, or some other hardware memory apparatus. Memory device 506 may comprise a single device or could be distributed across multiple devices, including devices in different geographic areas. Memory device 506 may be embedded in various types of equipment. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for control system 110. In particular, operating software 507 directs processing system 503 to generate a control mapping of areas of a piezoelectric grid to locations on a user interface of a computing device. Operating software 507 may also direct processing system 503 to direct communication interface 501 to receive test instructions comprising actuation information for a targeted portion of the user interface of the computing device. Operating software 507 directs processing system 503 to process the test instructions and the control mapping to determine control signals for the piezoelectric grid to implement the test instructions. Operating software 507 may also direct processing system 503 to direct communication interface 501 to transmit the control signals to the piezoelectric grid to actuate the targeted portion of the user interface of the computing device.

In this example, operating software 507 comprises a control mapping software module 508 that generates a control mapping of areas of a piezoelectric grid to locations on a user interface of a computing device. Operating software 507 also comprises a test instruction software module 509 that receives test instructions comprising actuation information for a targeted portion of the user interface of the computing device. Operating software 507 further comprises a control signal software module 510 that processes the test instructions and the control mapping to determine control signals for the piezoelectric grid to implement the test instructions. Finally, operating software 507 comprises a signal transmit software module 511 that transmits the control signals to the piezoelectric grid to actuate the targeted portion of the user interface of the computing device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of remotely actuating a user interface of a computing device, the method comprising:
   receiving actuation information for a targeted portion of the user interface;
   determining control signals for a piezoelectric grid that direct application of electricity to the piezoelectric grid to deform the piezoelectric grid for actuation of the targeted portion of the user interface; and
   transferring the control signals to the piezoelectric grid.

2. The method of claim 1, wherein the control signals provide an electrical charge to an area of the piezoelectric grid mapped to the targeted portion of the user interface.

3. The method of claim 2, wherein the control signals provide the electrical charge to the area of the piezoelectric grid mapped to the targeted portion of the user interface by providing an electrical field of sufficient strength to effectuate actuation of the targeted portion of the user interface.

4. The method of claim 1, further comprising:
   generating a control mapping of one or more areas of the piezoelectric grid to respective one or more portions, including the targeted portion, of the user interface.

5. The method of claim 4, wherein determining the control signals comprises:
   determining which of the one or more areas of the piezoelectric grid corresponds to the targeted portion of the user interface.

6. The method of claim 4, wherein the one or more portions of the user interface comprise one or more buttons of the user interface.

7. The method of claim 4, wherein the one or more portions of the user interface comprise one or more device actuators of the user interface.

8. The method of claim 4, wherein the one or more portions of the user interface comprise one or more locations on a touch screen.

9. The method of claim 1, wherein the actuation information is further for a second targeted portion of the user interface and wherein the control signals further direct application of electricity to the piezoelectric grid to deform the piezoelectric grid for actuation of the second targeted portion of the user interface.

10. A system to facilitate remote actuation of a user interface of a computing device, the system comprising:
    one or more computer-readable storage media;
    a processing system operatively coupled with the one or more computer-readable storage media; and
    program instructions stored on the one or more computer-readable storage media that, when read and executed by the processing system, direct the processing system to:
       receive actuation information for a targeted portion of the user interface;
       determine control signals for a piezoelectric grid that direct application of electricity to the piezoelectric grid to deform the piezoelectric grid for actuation of the targeted portion of the user interface; and
       transfer the control signals to the piezoelectric grid.

11. The system of claim 10, wherein the control signals provide an electrical charge to an area of the piezoelectric grid mapped to the targeted portion of the user interface.

12. The system of claim 11, wherein the control signals provide the electrical charge to the area of the piezoelectric grid mapped to the targeted portion of the user interface by providing an electrical field of sufficient strength to effectuate actuation of the targeted portion of the user interface.

13. The system of claim 10, wherein the program instructions further direct the processing system to:
    generate a control mapping of one or more areas of the piezoelectric grid to respective one or more portions, including the targeted portion, of the user interface.

14. The system of claim 13, wherein to determine the control signals, the program instructions direct the processing system to:
    determine which of the one or more areas of the piezoelectric grid corresponds to the targeted portion of the user interface.

15. The system of claim 13, wherein the one or more portions of the user interface comprise one or more buttons of the user interface.

16. The system of claim 13, wherein the one or more portions of the user interface comprise one or more device actuators of the user interface.

17. The system of claim 13, wherein the one or more portions of the user interface comprise one or more locations on a touch screen.

18. The system of claim 10, wherein the actuation information is further for a second targeted portion of the user interface and wherein the control signals further direct application of electricity to the piezoelectric grid to deform the piezoelectric grid for actuation of the second targeted portion of the user interface.

19. An apparatus for remote actuation of a user interface of a computing device, the apparatus comprising:
    a piezoelectric grid comprising a mesh of piezoelectric material that deforms upon application of electricity; and
    wherein the piezoelectric grid, when the mesh is installed onto a surface of the user interface, receives control signals to actuate a targeted portion of the user interface.

20. The apparatus of claim 19, wherein the control signals comprise an electrical charge to an area of the mesh mapped to the targeted portion of the user interface.

* * * * *